(12) United States Patent
Simske et al.

(10) Patent No.: US 9,027,147 B2
(45) Date of Patent: May 5, 2015

(54) VERIFICATION OF SERIALIZATION CODES

(71) Applicant: Hewlett-Packard Development Company, L.P., Houston, TX (US)

(72) Inventors: Steven J Simske, Ft. Collins, CO (US); Malgorzata M Sturgill, Ft. Collins, CO (US); Marie Vans, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 13/893,097

(22) Filed: May 13, 2013

(65) Prior Publication Data

US 2014/0337984 A1 Nov. 13, 2014

(51) Int. Cl.
*H04L 29/06* (2006.01)
*G06F 21/60* (2013.01)

(52) U.S. Cl.
CPC ..................... *G06F 21/60* (2013.01)

(58) Field of Classification Search
CPC ..................................................... G06F 21/60
USPC ................................................................ 726/26
See application file for complete search history.

(56) References Cited

U.S. PATENT DOCUMENTS

| | | | | |
|---|---|---|---|---|
| 4,652,856 | A * | 3/1987 | Mohiuddin et al. | 341/60 |
| 5,392,223 | A * | 2/1995 | Caci | 709/218 |
| 5,615,020 | A * | 3/1997 | Keith | 382/246 |
| 5,638,064 | A * | 6/1997 | Mori et al. | 341/58 |
| 6,557,124 | B1 * | 4/2003 | Cideciyan et al. | 714/701 |
| 8,176,088 | B2 * | 5/2012 | Rjaibi et al. | 707/802 |
| 8,667,285 | B2 * | 3/2014 | Coulier et al. | 713/171 |
| 2003/0188183 | A1 * | 10/2003 | Lee et al. | 713/200 |
| 2004/0139018 | A1 | 7/2004 | Anderson et al. | |
| 2006/0028361 | A1 * | 2/2006 | Piret et al. | 341/50 |
| 2006/0124756 | A1 * | 6/2006 | Brown | 235/492 |
| 2008/0167881 | A1 * | 7/2008 | Haas | 704/500 |
| 2009/0041244 | A1 * | 2/2009 | Lee et al. | 380/259 |
| 2009/0307032 | A1 | 12/2009 | Tribe et al. | |

(Continued)

OTHER PUBLICATIONS

"Anticounterfeiting Protection in the Pharmaceutical Industry", web page.

(Continued)

*Primary Examiner* — David García Cervetti
(74) *Attorney, Agent, or Firm* — Dhand Law

(57) ABSTRACT

An example apparatus may include a processor and a memory device including computer program code. The memory device and the computer program code may, with the processor, cause the apparatus to provide modified serialization codes for a first entity in a serialization flow to replace existing serialization codes for the first entity. In various examples, the modified serialization codes may have a representation of at least two different characters, and a number of instances of one of the characters in the representation of the modified serialization codes may be different from a number of instances of the one of the characters in the representation of the existing serialization codes. The memory device and the computer program code may further cause the apparatus to receive serialization codes from a second entity, the second entity being downstream in the serialization flow from the first entity; compare serialization codes from the second entity with the modified serialization codes; and verify the serialization codes from the second entity by determining if the serialization codes from the second entity are compatible with the modified serialization codes.

10 Claims, 4 Drawing Sheets

(56) References Cited

U.S. PATENT DOCUMENTS

2010/0127083 A1* 5/2010 Brown et al. .............. 235/492
2012/0013447 A1 1/2012 Simske et al.
2012/0254052 A1 10/2012 Gao et al.
2013/0339734 A1* 12/2013 Vernia et al. .............. 713/168

OTHER PUBLICATIONS

Aegate, "Mass Serialisation in the European Pharmaceutical Industry", Jun. 20, 2008.
Track & Trace and Serialisation.

* cited by examiner

VERIFICATION OF SERIALIZATION CODES

BACKGROUND

Serialization is used to uniquely identify each of a large set of items. For example, bar codes may be used to identify retail items. Similarly, serial numbers on various products are used to identify each individual product in such a set. Such identifiers may be applied to packaging material or may be applied to objects using labels or medallions, or even impressed or stamped directly on the object.

BRIEF DESCRIPTION OF THE DRAWINGS

For a more complete understanding of various examples, reference is now made to the following descriptions taken in connection with the accompanying drawings in which.

DETAILED DESCRIPTION

Figure 1:
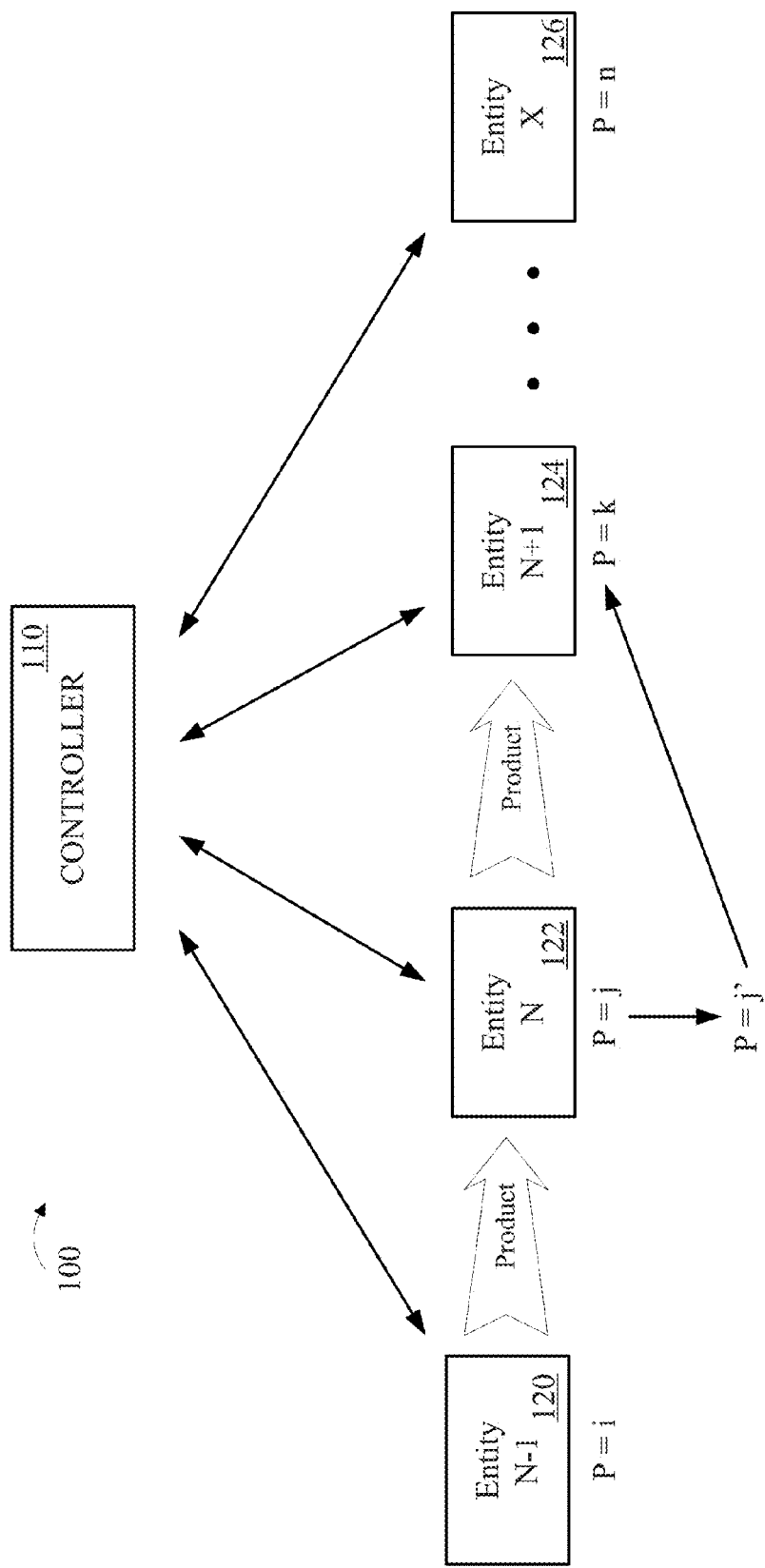
FIG. 1 illustrates an example serialization flow.

In various examples, in case of actual or suspected compromise of serialization codes in a serialization flow, any compromised serialization codes may be detected. In various serialization flows, incremental information object (IIO)-based serialization codes may be provided to each of a plurality of entities in the serialization flow. If the serialization codes for one of those entities is compromised (e.g., stolen or hacked) by an untrusted entity, the untrusted entity may use the compromised codes to inject counterfeit products into the serialization flow or the market, for example. Various examples described herein may be used to detect, counter or prevent the use of compromised codes in a malicious manner. Thus, for example, counterfeit products associated with the compromised serialization codes may be discovered. In various examples disclosed herein, modified serialization codes may be provided to an entity in the serialization flow. The modified codes may replace existing serialization codes which may have been compromised. In various examples, the modified serialization codes may correspond to a different P-band (e.g., different number of instances of 1 in a binary serialization code) than the existing codes. The serialization codes from a downstream entity (e.g., an entity that is later in the serialization flow) may then be compared with the modified codes to verify the serialization codes from the downstream entity. If the codes from the downstream entity are not compatible with the modified serialization codes, it may be concluded that the downstream entity has received invalid serialization codes (e.g., counterfeit products using the existing codes before they were replaced with the modified codes).

In various examples described herein, identifiers may be generated and/or used for mass serialization, such as for unique identification of a set of related products. In this regard, related products may be products which are, for example, equivalent to one another at a point of sale. In various examples, a product may be a physical object, such as a package, a label or a printed document. In other examples, a product may be a virtual object, such as an electronic record, electronic transaction, electronic document or the like. The product may be any of a variety of objects, such as an object for retail sale, a component for a larger assembly, etc. The identifier may be any of a variety of identifiers, such as a bar code, a 2-D bar code such as a quick-response (QR) code, or the like. The identifier may be used to identify various features of the product. For example, in the retail arena, the identifier may be used to identify the type of product (e.g., brand, type and size of a box of cereal) to be used at the point of sale. In other examples, the identifier may be used to uniquely identify each item in a set of items such as, for example, a serial number for each component in a set of identical components. As noted above with reference to an object, in various examples, a component may be physical component or a virtual component.

A set of identifiers for mass serialization may use a large number of unique identifiers. For example, a serial number may be assigned to each unit of a product for which a large number of units may be produced. Thus, each unit would be assigned a unique identifier.

A discussion of certain concepts is useful in understanding the various examples described herein. First, it is noted that the number of combinations ($C_{n,p}$) for selecting p items out of n items, where p and n are both non-negative integers and where p≤n, is defined as:

$$C_{n,p} = \binom{n}{p} = \frac{n!}{p!(n-p)!}.$$

where n! is the factorial operator: $n! = n*(n-1)*(n-2)* \ldots *1$. By definition, $0! = 1$.

Serialization may provide a unique identifier to each of a plurality of items. For serialization, the number of serialization combinations is dictated by the base, b, of the character to be printed, raised to the power of N, the number of digits to be printed. For example, if the 26 uppercase and 26 lowercase English characters, along with the 10 numerals are used, then the base is 62, and the number of possible mass serialized values is $62^N$. In other examples, for a binary string, the base is 2. In general, the number of mass serialized values, $n_{MS}$, is given by:

$$n_{MS} = b^N.$$

If the base of the serialization is a, power of 2; that is, $b=2^P$, then the number of mass serialized values is:

$$n_{MS} = 2^{PN}.$$

Thus, the mass serialization may represents PN bits. If b is not a power of two, then:

$$n_{MS} = 2^{N \log_2 b}.$$

Thus, in various examples, the serialization provides N $\log_2$ b bits of data. For mapping to this serialization, then, the fractional portion of N $\log_2$ b may be ignored, and the integer portion may represent the number of bits encoded into the N digits using the b-wide character set.

In various examples, the number of bits of data may represent the length of a binary representation of the serialization and may be set to a predetermined length (B). Further, in various examples, the number of instances of 1 in the binary representation may be set within a predefined range. In one example, the length of the binary representation may be set at 40, and the number of instances of 1 in the binary representation may be set between 10 and 22.

In one example of an incremental information object (IIO)-based inference model, 40 bits for serialization may be used. Thus, there are $2^{40} = 1,099,511,627,776$ different 40-bit binary strings. Table 1 illustrates the number of combinations possible for every value of p, where p is the number of instances of 1 in the 40-bit binary string.

TABLE 1

| p | $C_{40,p}$ | Data Set Usage | % Combinations |
|---|---|---|---|
| 0 | 1 | | 0.00% |
| 1 | 40 | | 0.00% |
| 2 | 780 | | 0.00% |
| 3 | 9,880 | | 0.00% |
| 4 | 91,390 | | 0.00% |
| 5 | 658,008 | | 0.00% |
| 6 | 3,838,380 | | 0.00% |
| 7 | 18,643,560 | | 0.00% |
| 8 | 76,904,685 | | 0.01% |
| 9 | 273,438,880 | | 0.02% |
| 10 | 847,660,528 | | 0.08% |
| 11 | 2,311,801,440 | | 0.21% |
| 12 | 5,586,853,480 | | 0.51% |
| 13 | 12,033,222,880 | | 1.09% |
| 14 | 23,206,929,840 | | 2.11% |
| 15 | 40,225,345,056 | Inference Set State N − 1 | 3.66% |
| 16 | 62,852,101,650 | | 5.72% |
| 17 | 88,732,378,800 | | 8.07% |
| 18 | 113,380,261,800 | Inference Set State N | 10.31% |
| 19 | 131,282,408,400 | | 11.94% |
| 20 | 137,846,528,820 | | 12.54% |
| 21 | 131,282,408,400 | | 11.94% |
| 22 | 113,380,261,800 | Inference Set State N + 1 | 10.31% |
| 23 | 88,732,378,800 | | 8.07% |
| 24 | 62,852,101,650 | | 5.72% |
| 25 | 40,225,345,056 | Inference Set State N + 2 | 3.66% |
| 26 | 23,206,929,840 | | 2.11% |
| 27 | 12,033,222,880 | | 1.09% |
| 28 | 5,586,853,480 | | 0.51% |
| 29 | 2,311,801,440 | | 0.21% |
| 30 | 847,660,528 | | 0.08% |
| 31 | 273,438,880 | | 0.02% |
| 32 | 76,904,685 | | 0.01% |
| 33 | 18,643,560 | | 0.00% |
| 34 | 3,838,380 | | 0.00% |
| 35 | 658,008 | | 0.00% |
| 36 | 91,390 | | 0.00% |
| 37 | 9,880 | | 0.00% |
| 38 | 780 | | 0.00% |
| 39 | 40 | | 0.00% |
| 40 | 1 | | 0.00% |
| SUM | 1,099,511,627,776 | | 100.0% |

In various examples, the number of instances of 1 is set in, or enforced to be, a range defined by a lower number (L) of instances of 1 (e.g., 10) and an tipper number (U) of instances of 1 (e.g., 24). Thus, the total number of allowed mass serialization values belonging to the defined range is then given by:

$$n_{MS} = \sum_{p=L}^{p=U} \binom{B}{p}.$$

In various examples, a database of binary strings may be used for a static set of mass serialized numbers with between L and U 1's in the string. The same database may be used for a set of incremental information objects (or IIOs) which may accommodate a stage progression, or a serialization flow. For example, a serialization flow may include stages 1, 2, ... X. In this regard, the number of instances of 1 may change within the range delimited by U and L at different stages. In various examples, the number of instances of 1 may jump from less 1's to more 1's as the serialization flow progresses downstream (e.g., a later state in the serialization flow). For example, the serialization of a product may flow from the serialization used at the manufacturing site to the serialization used at the packaging site to the serialization used at the retailing site, etc. This serialization flow may be achieved through various types of IIOs, such as progressive barcodes, for example.

Referring now to FIG. 1, a serialization flow in accordance with an example is illustrated. In various examples, the serialization flow 100 may be associated with a product which passes through various entities of the serialization flow 100, such as entities N−1 120, N 122, N+1 124, . . . , to entity X 126. The example of FIG. 1 illustrates a product progressing through the various entities 120-126 in the serialization flow. In various examples, the various entities may correspond to, for example, manufacturing, packaging, shipping, etc. Of course, in various examples, the serialization flow may include additional entities. For example, the entity N−1 120 may receive the product from another entity (not shown) that is upstream (e.g., an entity that is earlier in the serialization flow, or to the left in FIG. 1) in the serialization flow 100.

In various examples, one or more entities in the serialization flow 100 may receive a set of serialization codes from a controller 110, as indicated by the arrows from the controller 110 to each entity 120-126 in the serialization flow 100. The controller 110 may be an owner entity or a manager entity which may be responsible for the serialization flow 100, for example. In this regard, the controller 110 may be aware of the serialization codes for each entity in the serialization flow 100. In various examples, the sets of serialization codes may take different forms (or may be represented in different forms) and may be used as identifiers of the products in the serialization flow. Further, in some examples, as illustrated in the example of FIG. 1, in addition to delivery of the serialization codes from the controller 110 to the entities 120-126 in the serialization flow 100, at least some of the entities 120-126 may also transmit certain information back to the controller 110.

As noted above, in various examples, the number of instances of 1 in the serialization codes may change as the serialization flow progresses through different stages. In various examples, the number of instances of 1 may jump from less 1's to more 1's as the serialization flow progresses downstream. In this regard, each entity may be assigned a P-value corresponding to the number of instances of 1 in the serialization codes at the corresponding stage. For example, in the example of FIG. 1, an incremental information set may use p=i (for entity N−1), p=j (for entity N), p=k (for entity N+1), . . . , and p=n (for entity X). In one example, the p values for the various stages in FIG. 1 may be p=15 (for entity N−1), 18 (for entity N), 22 (for entity N+1) and 25 (for entity X).

In various examples, the serialization codes for an entity in the serialization flow may be compromised. For example, the serialization codes for entity N 122 may be leaked to, or otherwise obtained by, an organization or individual which may be untrusted. The organization or individual may choose to illicitly use the compromised serialization codes to produce counterfeit products and insert them into the serialization flow. For example, the organization may use the compromised serialization codes to insert counterfeit products bearing the compromised serialization codes for entity N 122 and provide the counterfeit products to entity N+1 124.

In response to an indication that the serialization codes have been, or may have been, compromised, various examples described herein may take reactive action to detect and/or prevent use of the compromised codes. For example, in various examples, counterfeit products using the compromised codes may be detected downstream in the serialization flow.

Referring again to the example of FIG. 1, in response to an indication that the existing serialization codes (e.g., codes with p=j) for entity IN 122 have been compromised, the controller 110 may issue a modified set of serialization codes to entity N 122. In various examples, the modified set of serialization codes has a different number of instances of a character in each serialization code than the existing serialization codes. For example, while the existing serialization codes have j 1's in each binary representation of a serialization code, the modified serialization codes may have j' 1's in each binary representation of a serialization code. Thus, as illustrated in the example of FIG. 1, the serialization codes for entity N 122 may be modified from p=j to p=j'.

In various examples of serialization flows, the number of instances of 1 may increase as the serialization flow proceeds downstream. Thus, i<j<k< . . . <n. In this regard, the modified serialization codes in various examples may also satisfy this characteristic. Thus, i<j'<k< . . . <n. In some examples, the number of instances of 1 in the modified serialization codes is greater than the number of instances of 1 in the existing serialization codes. Thus, in some examples, j<j'. For example, in modifying the serialization codes, the serialization codes for entity N 122 may be moved to increase the number of instances of 1 by 1. In various examples, the entity N 122 may use the modified serialization codes for products being provided to entity N+1 124.

Figure 2:
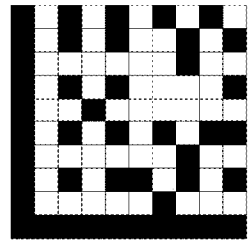
FIG. 2 illustrates an example identifier.

Referring now to FIG. 2, an example identifier is illustrated that may be used to represent a serialization code. The example identifier of FIG. 2 is a two-dimensional, machine-readable, bar code having a plurality of regions (e.g., squares) that may be white or black. In other examples, additional colors may also be used. A blank template of the example identifier may include black squares along two adjacent sides and alternating black and white squares along the two other adjacent sides. This configuration may allow for the correct identification of the orientation of the identifier by a machine reading the identifier, such as a scanner. The example identifier of FIG. 2 may be a representation of a code in the set of serialization codes received by a first entity (e.g, entity N 122). The identifier may be modified at a second stage (e.g., packaging stage) by changing additional white squares to black.

In various examples, the identifiers and/or the serialization codes may have a representation as a string of characters. For example, the example identifier of FIG. 2 may be represented as a binary string of 0's and 1's. In other examples, the string of characters may include various other types of characters, such as lower case letters, upper case letters, numerals, and/or various other types of characters.

Figure 3:
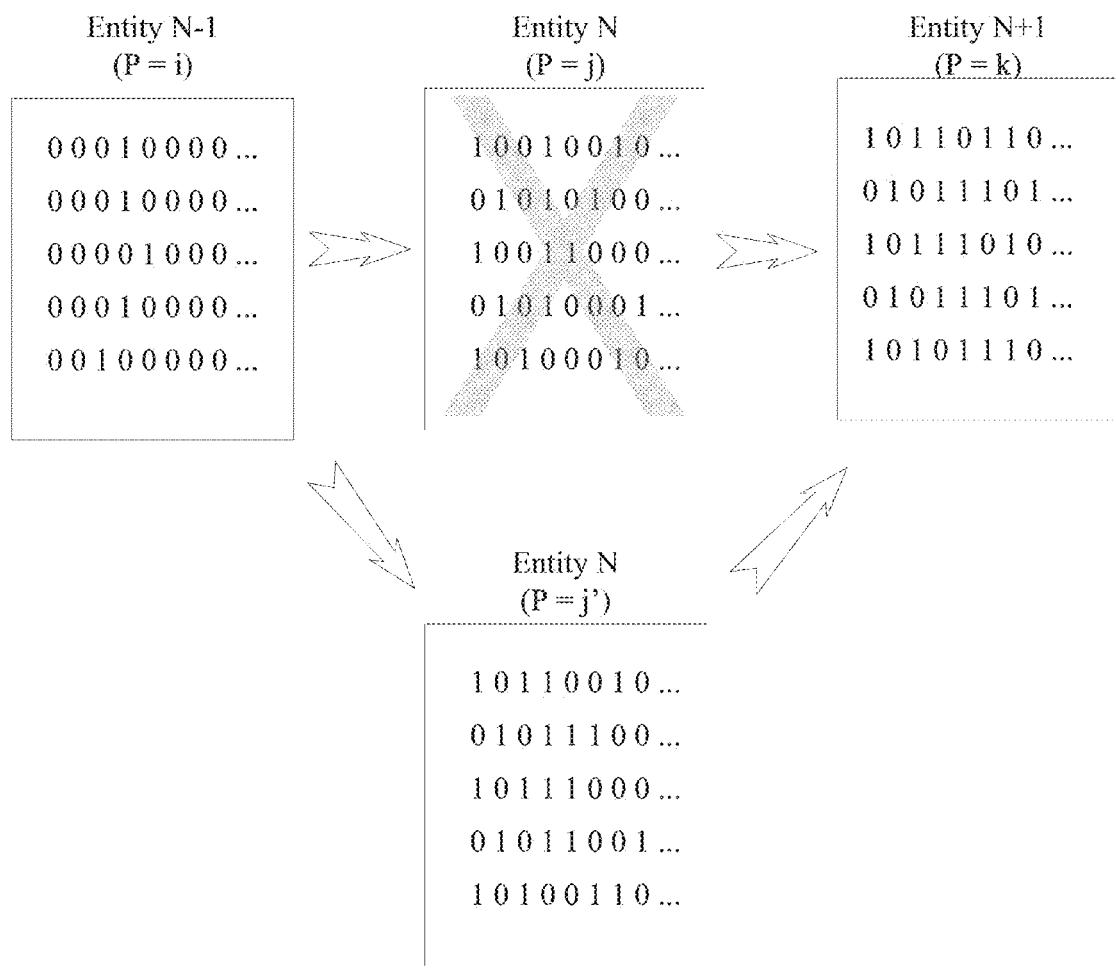
FIG. 3 illustrates an example progression of a binary representation of identifiers.

FIG. 3 illustrates an example identifier represented as a binary string of 0's and 1's. FIG. 3(*a*) illustrates an example set of identifiers at, for example, a first stage (e.g., at entity N−1 120). For sake of simplicity, FIG. 3 illustrates a set including only five identifiers, each identifier having a length of a predetermined number of bits, the first 8 of which are shown in the examples of FIG. 3 for each string. Of course, those skilled in the art will appreciate that a set may include any number of identifiers and may have any selected length.

In various examples, each identifier in the set may be formed to have a predefined range of number of characters. For example, in the illustrated example of FIG. 3, the identifiers may have a length of 40 characters and may be formed to have between 10 and 24 1's.

In various examples, at each stage of serialization, each identifier in the set may have a predetermined number of instances, or a predetermined range of number of instances, of 1's, with each downstream stage having more instances of 1 than the previous stage. For example, in the illustrated example of FIGS. 1 and 3(*a*), each identifier in the set for the entity N−1 120 may have i 1's, where i may be 10 in one example. At another stage in the serialization flow, such as the stage for the entity N 122, each identifier in the set may have a different number of instances or range of number of instances of 1, such as j 1's, where j may be 14 in one example. Similarly, at still another stage in the serialization flow, each identifier may have still a different number instances or range of number of instances of 1, such as k 1's at the entity N+1 124.

As described above with reference to the example of FIG. 1, in response to actual or possible compromising of the serialization codes for an entity, such as entity N 122, the serialization codes for that entity may be replaced with modified serialization codes. In this regard, FIG. 3 illustrates an example in which the existing serialization codes for entity N 122 having j 1's in each serialization code representation are replaced with modified serialization codes having j' 1's. In one example, the existing serialization codes may have j=14 1's in each serialization code, and the modified serialization codes may have j'=15 1's in each serialization code.

Figure 4:
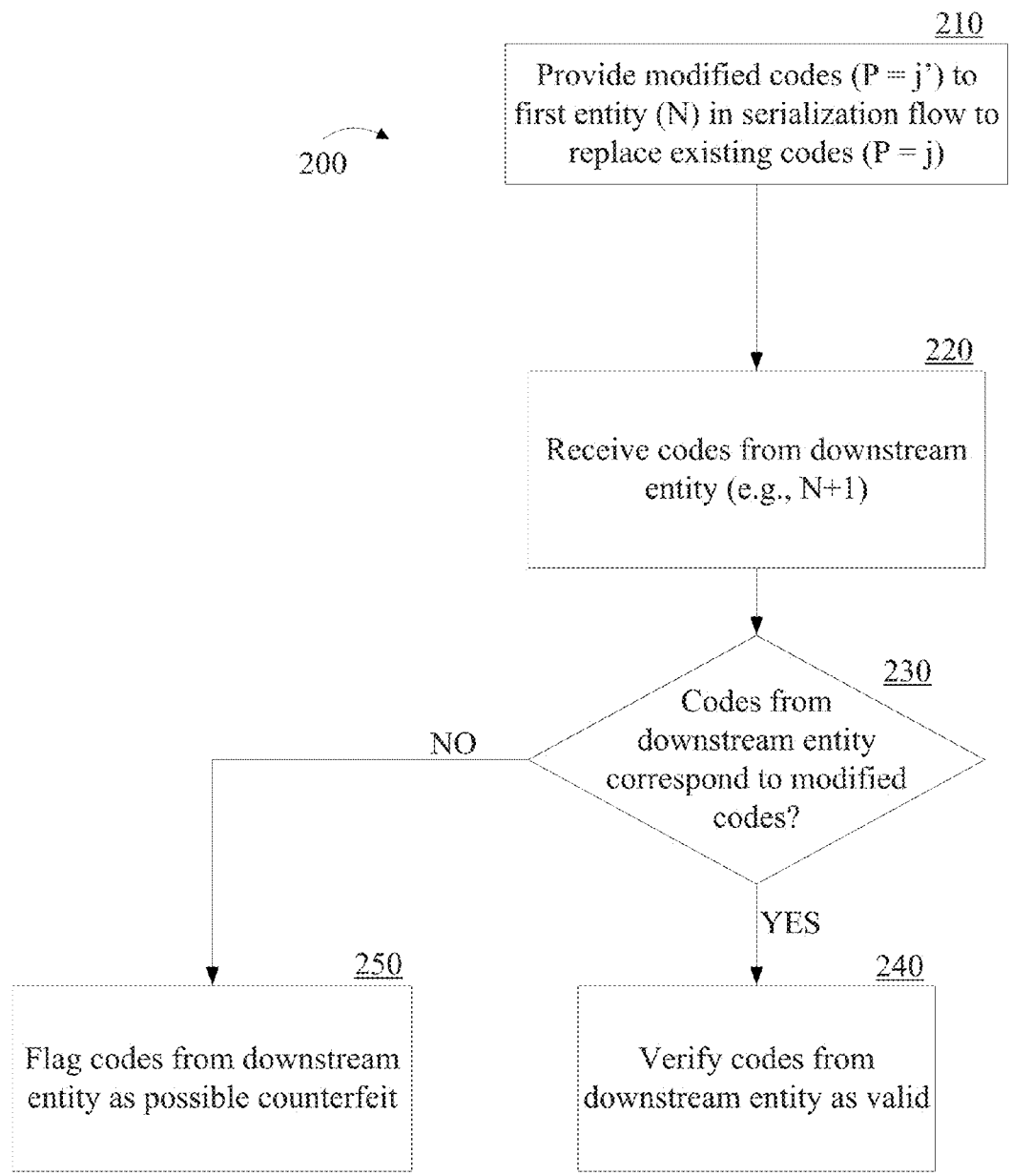
FIG. 4 is a flow chart illustrating an example method.

Referring now to FIG. 4, a flow chart illustrates an example method by which an entity, or serialization codes from an entity, may be verified. In the example process 200 of FIG. 4, a controller (e.g., the controller 110 of FIG. 1) may provide modified serialization codes to a first entity in a serialization flow to replace existing serialization codes (block 210). In some examples, the first entity may be an entity for which the serialization codes have been, or may have been, compromised. As described above, in various examples, the modified serialization codes may have a representation of two or more characters, such as a binary representation. The number of instances of a particular one of the characters from the overall set of possible characters in the representation of each modified serialization code may be different than the number of instances of that one character in the representation of each existing serialization code. For example, the number of instances of 1 in the modified serialization codes may be j', and the number of instances of 1 in the existing serialization codes may be j. In some examples, j' is greater than j.

In various examples, the modified codes may be used by the first entity (e.g., entity N 122 in FIG. 1) for a product, which may be delivered to a second entity (e.g., entity N+1 124 in FIG. 1). In the example method of FIG. 4, the controller may receive codes from the second entity (e.g., entity N+1 124) (block 220). In one example, the serialization codes received from the second entity may be simply the codes received by the second entity from the first entity. In other examples, the controller may receive serialization codes from an entity that is further downstream. In other words, there may be intervening entities between the first entity and the second entity that may have progressed the serialization codes.

The controller may compare the serialization codes from the second entity to the modified serialization codes provided by the controller to the first entity and may determine whether the codes from the second entity are compatible with, or correspond to, the modified serialization codes (block 230). In various examples, if the codes from the second entity are simply the codes received by the second entity from the first entity, the controller may determine whether the codes received from the second entity are identical to the modified codes. In other examples, if the codes from the second entity have been progressed from the first entity, the controller may determine, for example, whether the codes received from the second entity could have been achieved from the modified codes.

In various examples, if the serialization codes received from the second entity are compatible with, or correspond to, the modified serialization codes, the controller may verily the codes from the second entity as valid (block 240). On the other hand, in various examples, if the serialization codes received from the second entity are not compatible with, or do not correspond to, the modified serialization codes, the controller may flag the codes from the second entity as possibly being invalid or counterfeit (block 250). In various examples, the controller may further compare the codes received from the second entity to the original serialization codes (e.g., the serialization codes existing before replacement with the modified codes) to determine a possible source of the invalid codes.

Figure 5:
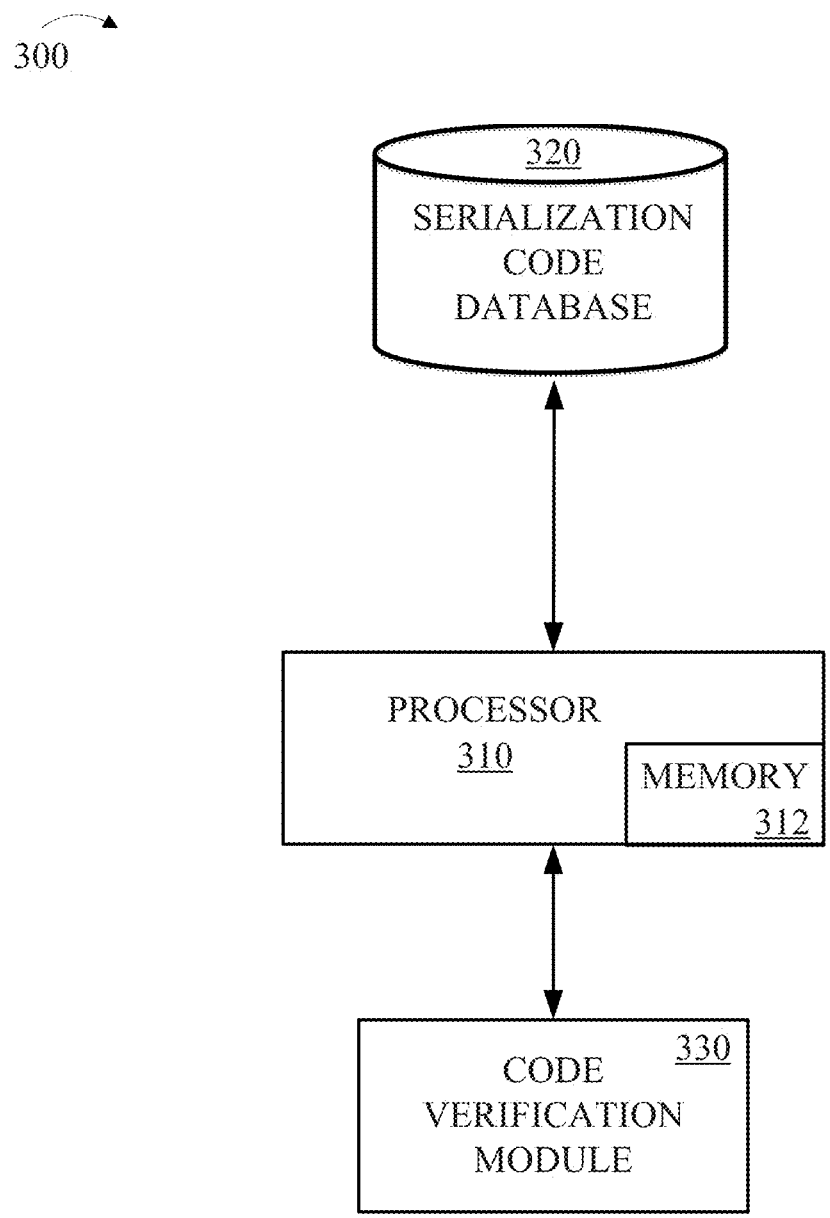
FIG. 5 illustrates an example system.

Referring now to FIG. 5, an example system is illustrated. The system 300 may be implemented in the serialization flow 100, for example, at the controller 110. The system 300 includes a processor 310 which may have a non-transitory memory device 312. In various examples, the memory device may be integrally formed with the processor or may be an external memory device. The memory device 312 may include program code that may be executed by the processor. For example, one or more processes may be performed to execute the example method described above with reference to FIG. 4.

The example system 300 may further include a serialization code database 320 which may store serialization codes for one or more entities in the serialization flow, for example. In various examples, the serialization database 320 may include the all sets of serialization codes used in the serialization flow 100, including modified serialization codes and previously existing serialization codes.

The example processor 310 of the system 300 may be in communication with a code verification module 330. In various examples, the code verification module 330 may compare different sets of serialization codes and provide the results of the comparison to the processor 310. The processor 310 may, for example, verify serialization codes and/or flag serialization codes as invalid or counterfeit, as described above.

Thus, in various examples, actual or suspected compromise of serialization codes in a serialization flow may be detected. Counterfeit products associated with the compromised serialization codes may be discovered.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
 a processor; and
 a memory device including computer program code, the memory device and the computer program code, with the processor, for causing the apparatus to perform at least the following:
  provide modified serialization codes for a first entity in a serialization flow to replace existing serialization codes for the first entity in response to an indication that the existing serialization codes have been compromised to an untrusted entity,
   wherein the modified serialization codes have a representation of at least two different characters, and
   wherein a number of instances of one of the characters in the representation of the modified serialization codes is different from a number of instances of the one of the characters in the representation of the existing serialization codes;
  receive serialization codes from a second entity, the second entity being downstream in the serialization flow from the first entity;
  compare serialization codes from the second entity with the modified serialization codes; and
  verify the serialization codes from the second entity by determining if the serialization codes from the second entity are compatible with the modified serialization codes.

2. The apparatus of claim 1, wherein the modified serialization codes are represented as binary strings of 0's and 1's.

3. The apparatus of claim 2, wherein the number of instances of 1 in the representation of the modified serialization codes is greater than the number of instances of 1 in the representation of the existing serialization codes.

4. The apparatus of claim 1, wherein the serialization codes from the second entity are compatible with the modified serialization codes when the serialization codes for the second entity could be achieved from the modified serialization codes.

5. The apparatus of claim 1, wherein the serialization codes received from the second entity are serialization codes received by the second entity from another entity in the serialization flow.

6. The apparatus of claim 5, wherein the another entity is the first entity.

7. A computer program product, embodied on a non-transitory computer-readable medium, comprising:
 computer code for providing modified serialization codes for a first entity in a serialization flow to replace existing serialization codes for the first entity in response to an indication that the existing serialization codes have been compromised to an untrusted entity,
   wherein the modified serialization codes have a representation of at least two different characters, and
   wherein a number of instances of one of the characters in the representation of the modified serialization codes is different from a number of instances of the one of the characters in the representation of the existing serialization codes;
computer code for comparing serialization codes from a second entity with the modified serialization codes, the second entity being downstream in the serialization flow from the first entity; and
computer code for verifying the serialization codes from the second entity by determining if the serialization codes from the second entity are compatible with the modified serialization codes.

8. The computer program product of claim 7, wherein the modified serialization codes are represented as binary strings of 0's and 1's.

9. The computer program product of claim 8, wherein the number of instances of 1 in the representation of the modified serialization codes is greater than the number of instances of 1 in the representation of the existing serialization codes.

10. The computer program product of claim 7, wherein the serialization codes from the second entity are compatible with the modified serialization codes when the serialization codes from the second entity could be achieved from the modified serialization codes.

\* \* \* \* \*